Feb. 23, 1954     E. L. WETZIG, SR     2,669,787
TRACTOR CONTOUR LEVEL
Filed March 14, 1952
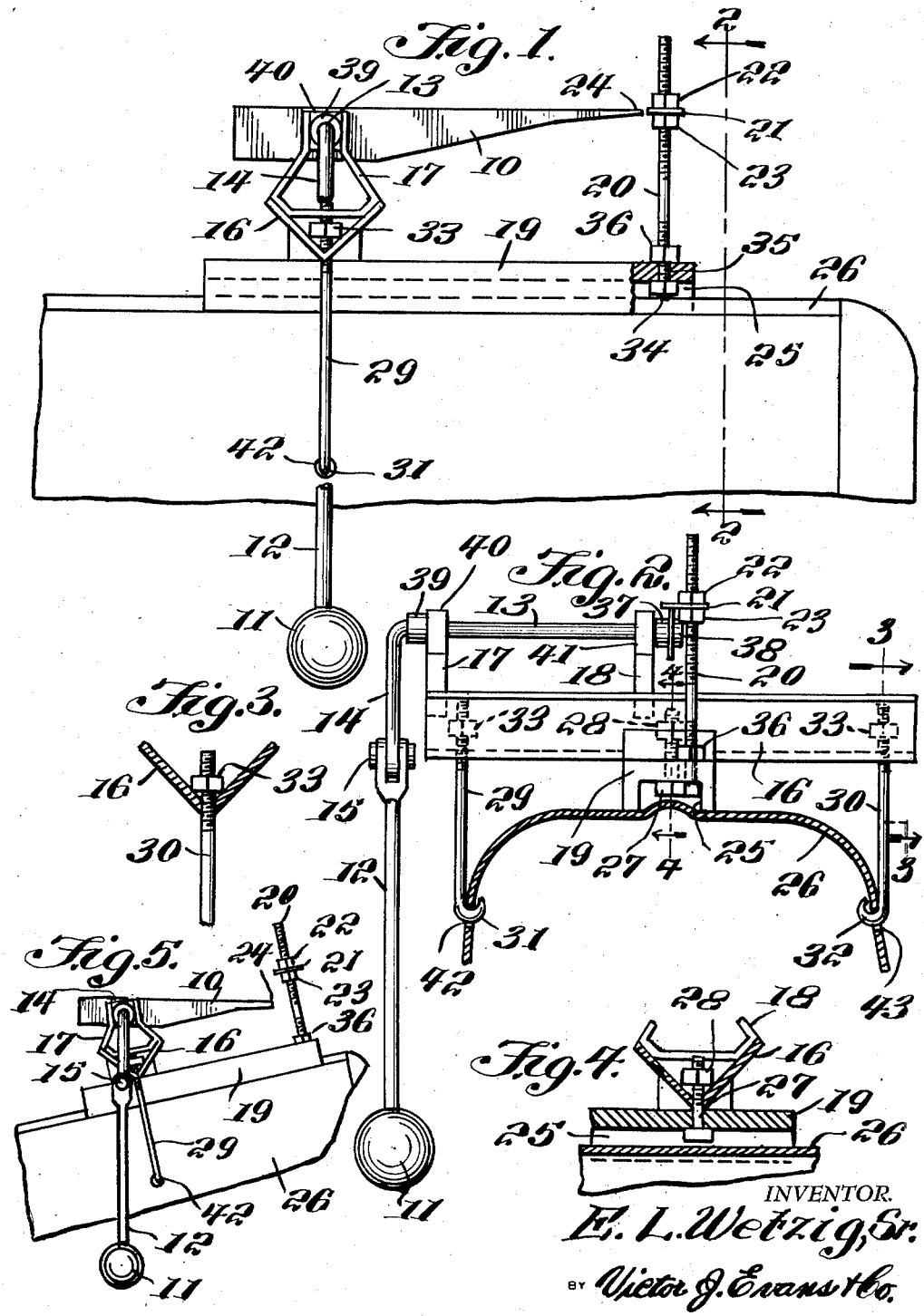
INVENTOR.
E. L. Wetzig, Sr.
BY Victor J. Evans & Co.
ATTORNEYS Patented Feb. 23, 1954

2,669,787

UNITED STATES PATENT OFFICE 2,669,787

TRACTOR CONTOUR LEVEL

Ernest L. Wetzig, Sr., Carrizo Springs, Tex.

Application March 14, 1952, Serial No. 276,649

1 Claim. (Cl. 33—215)

This invention relates to level indicators, particularly as used on tractors to determine the grade of ground over which the tractor is traveling, and in particular a horizontally disposed pointer pivotally mounted on a tractor housing with a level indicating plate adjustably mounted on the housing and with a weight suspended by an arm extended from one side of the pointer whereby the pointer is retained in the horizontal position by gravity.

The purpose of this invention is to provide a level indicating device for showing when a tractor is traveling on level ground and, when the tractor is traveling up or down a grade, or showing approximately the angle at which the tractor is positioned in relation to a horizontal plane.

Various types of levels particularly of the spirit level or bubble type have been mounted on and incorporated in tractors however, owing to the the abuse to which tractors are subjected comparatively delicate devices of this type are not dependable. With this thought in mind this invention contemplates a level indicating device in the form of a pointer pivotally mounted on the housing of a tractor and actuated by a counterweight or ball depending therefrom wherein with the device pivotally mounted on a tractor housing the counterweight retains the pointer in a horizontal position continuously.

The object of this invention is, therefore, to provide a mounting for a level indicating needle or pointer whereby the device is adapted to be mounted on a tractor with a weight for retaining the pointer in a horizontal position positioned at one side of the tractor housing.

A further object of the invention is to provide a level indicating device for tractors which is of a simple and economical construction.

With these and other objects and advantages in view the invention embodies a mounting plate or bar with a level indicating plate adjustably mounted on a stud extended upwardly from one end and with a pointer pivotally mounted on a transverse member and actuated by a weight extended downwardly from one end of said transverse member.

Other features and advantages of the invention will appear from the following description taken in connection with the drawing wherein:

Figure 1 is a side elevational view illustrating a portion of a tractor housing with the leveling device mounted upon the upper surface thereof and with parts broken away and shown in section.

Figure 2 is a cross section through the tractor housing taken on line 2—2 of Fig. 1, showing the level indicating device in elevation.

Figure 3 is a detail showing a section taken on line 3—3 of Fig. 2 illustrating the manner of attaching mounting bolts through the transverse member of the leveling device.

Figure 4 is a similar section taken on line 4—4 of Fig. 2 showing the mounting of the transverse member on the longitudinally disposed member of the leveling device.

Figure 5 is a detail on a reduced scale showing the parts illustrated in Fig. 1 with the tractor traveling up a grade.

Referring now to the drawing wherein like reference characters denote corresponding parts the improved tractor leveling device of this invention includes a pointer 10, a weight 11 connected to the pointer with a link 12 and a horizontally disposed shaft 13 which is provided with a depending arm 14 on the lower end of which the link 12 is pivotally mounted with a pin 15, a transversely disposed angle iron 16 on which the shaft 13 is journaled with bearing yokes 17 and 18, a longitudinally disposed base 19 on which the transverse member 16 is mounted, and a stud 20 extended upwardly from the forward end of the base 19 having a plate 21 positioned between nuts 22 and 23 thereon whereby the plate may be adjusted, with the tractor positioned on a level surface to correspond with the point 24 of the pointer 10.

The base 19, which is preferably formed with an elongated recess 25 is positioned on the housing 26 of a tractor and the transversely disposed member 16 is secured to the base by a bolt 27 on the upper end of which a nut 28 is threaded, as shown in Fig. 4.

The transverse angle iron 16 is secured to the base 19 at the center of the angle iron 16 with the bolt 28 and the end of the angle iron is secured with stay bolts 29 and 30 to the housing, as illustrated in Fig. 2. The lower ends of the bolts 29 and 30 are provided with hooks 31 and 32, respectively and the upper ends, which extend through the ends of the angle iron 16 are held by nuts 33, as shown in Fig. 3.

The stud 20, which is provided with a head 34 is secured in an opening 35 in the end of the base 19 with a nut 36 and with the stud spaced beyond the point 24 of the pointer 10 the pointer is free to swing vertically to correspond with the plate 21.

The pointer 10 is clamped on the end of the shaft 13 with nuts 37 and 38 and the opposite end of the shaft 13 may be provided with a set collar 39 which in combination with the nut 37 locates the shaft longitudinally in the bearings 40 and 41 in the upper parts of the bearing yokes 17 and 18, respectively.

With the parts assembled in this manner the base 19 is positioned upon the housing 26 of the tractor and with the hooks 31 and 32 of the stay bolts 29 and 30 extended through openings 42 and 43 in the tractor housing the level indicating device may be clamped to the housing and with the device in position and also with the tractor on level ground the plate 21 is adjusted to correspond with the tip 24 of the pointer 10.

By this means the level position of the tractor is indicated continuously and the angle of a grade upon which the tractor is traveling is indicated approximately by the pointer 10.

It will be understood that modifications may be made in the design and arrangement of the parts without departing from the spirit of the invention.

What is claimed is:

In a tractor level indicator, the combination which comprises an elongated base for mounting the indicator on a tractor housing, a transversely disposed member mounted on said base, a shaft journaled on said transverse member, a pointer carried by one end of the shaft, a depending arm on the opposite end of the shaft, a weight pivotally mounted on the arm and depending therefrom, a stud extended upwardly from the base, and a plate adjustably mounted on the stud and positioned to register with an end of the pointer for indicating the level position of the tractor on which the base is mounted.

E. L. WETZIG, Sr.

References Cited in the file of this patent

UNITED STATES PATENTS

| Number | Name | Date |
|---|---|---|
| 191,954 | Gissinger | June 12, 1877 |
| 1,319,249 | Rummer | Oct. 21, 1919 |
| 1,623,234 | Cutter | Apr. 5, 1927 |
| 1,796,743 | Bredenfeld | Mar. 17, 1931 |
| 2,181,444 | Zook | Nov. 28, 1939 |
| 2,402,682 | Shriro | June 25, 1946 |
| 2,459,879 | Hardwick | Jan. 25, 1949 |